Jan. 12, 1965
R. J. KLEIN ETAL
3,165,467
OIL FILTER
Filed March 29, 1962
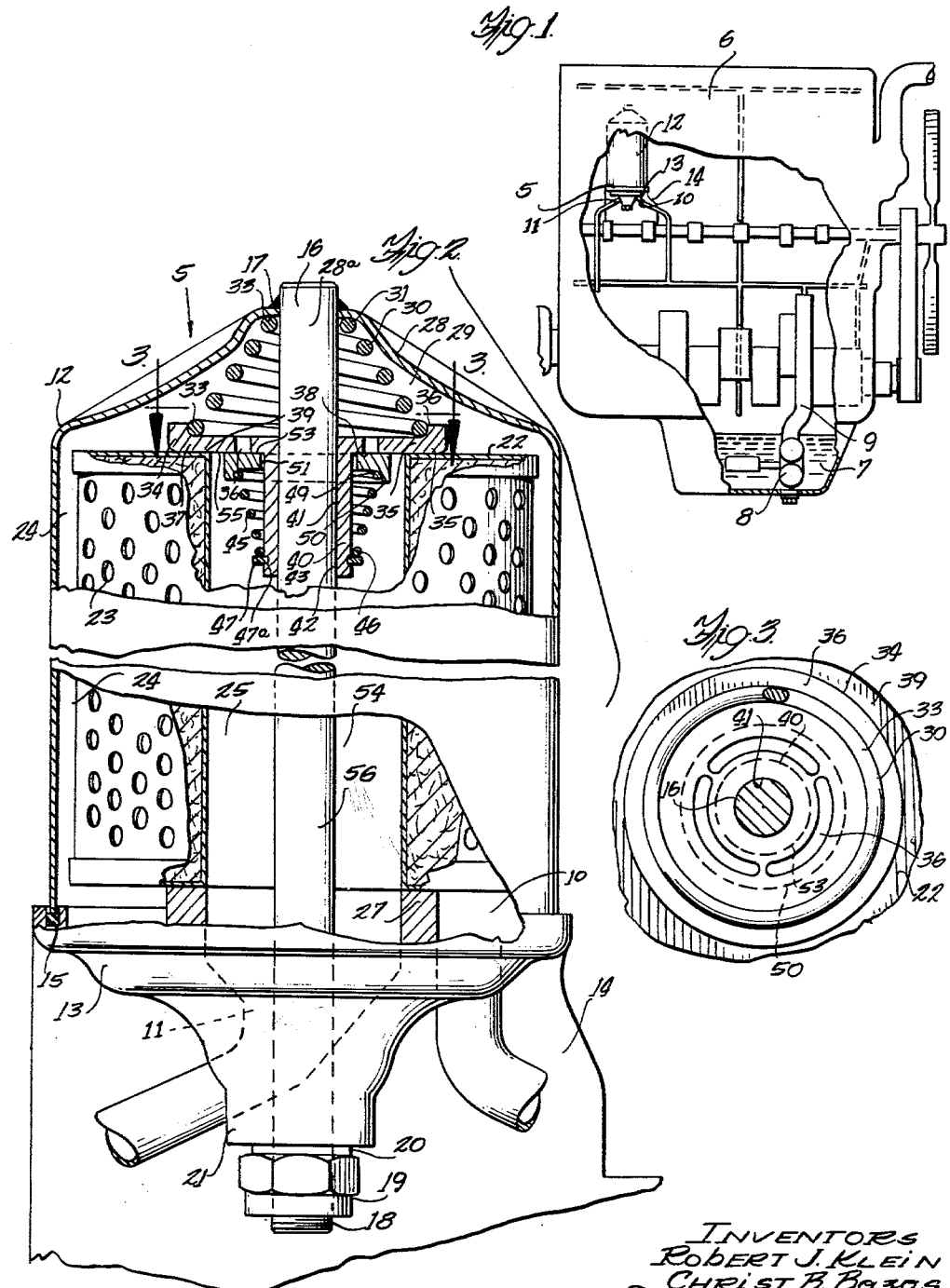
INVENTORS
ROBERT J. KLEIN
CHRIST B. BOJOS
Paul O. Pippel
ATTORNEY

United States Patent Office 3,165,467
Patented Jan. 12, 1965

3,165,467
OIL FILTER
Robert J. Klein, Elmhurst and Christ B. Bozos, Hinsdale, Ill., assignors to International Harvester Company, Chicago, Ill., a corporation of New Jersey
Filed Mar. 29, 1962, Ser. No. 183,543
1 Claim. (Cl. 210—130)

This invention relates generally to filters and particularly to filters which may be employed to filter lubricating oil of an internal combustion engine or the like.

In the process of filtering impurities from the oil, the filter may become clogged and therefore a bypass arrangement needs to be provided which permits free flow of the oil.

It is therefore a general object of this invention to provide a novel oil filter with bypass means to circumvent the oil filter when it becomes clogged by impurities in the oil.

A more specific object is the provision, in a filter having an upwardly open cap, of the combination of a housing cylinder for attachment to said cap so as to define therewith a filter chamber, and having a fixed, closed upper end and a lower end for engaging the cap in a sealed ring of pressure contact; a hollow cored, filter element and a hold-down stud element, disposed one element within the other in the filter chamber and with an annular space between each element and the surrounding element; the cylinder being substantially coextensive in length with the filter element; said cap being located adjacent the lower end of the filter element and providing support so as to hold the filter element in a completely exposed condition when the housing cylinder is removed; the hold-down stud element having the upper end joined fluid tight to the fixed, closed end of the cylinder, and having a detachable lower end and a fastener carried thereby as the hold-down means to engage the cap; biasing means between the upper end of the housing cylinder and the corresponding upper end of the filter element; and a unitized valve assembly comprising a spring seat clamped between the upper end of the filter element and the biasing means, and serving as a hold-down to cause the supported lower end of the filter element to be seated in a ring of pressure contact exerted against the cap; the spring seat having a depending sleeve and defining a valve port which has an axis extending generally parallel to the sleeve and which is spaced apart radially outwardly thereof; a filter by-passing valve carried by the spring seat below and in covering relation to the valve port thereof; said spring seat sleeve engaging the stud element in guided sliding relation and supporting the by-passing valve thereon in guided sliding relation; the sleeve having a distal end; and biasing means in the unitized valve assembly between the distal end of the sleeve and the by-passing valve, and biasing said valve with predetermined sealing force against the valve port in the spring seat.

Another object in line with the foregoing objective is the provision, in the combination described, of an upwardly open cap such as referred to, having an upstanding annular seat against which the aforesaid ring of pressure contact is exerted by the lower end of the filter element; the cap further having an inlet passage outside said annular seat which introduces unfiltered fluid into the filter chamber; and an outlet passage inside the annular seat which is separated thereby from the inlet passage and which discharges all fluid either passing through the filter element or by-passing the filter element.

Other objects and advantages of the invention will become apparent from the following description taken in connection with the accompanying drawing, wherein:

FIGURE 1 is a schematic view of an internal combustion engine illustrating in part the lubrication system employing the novel filter assembly;

FIGURE 2 is an enlarged cross-sectional view of the oil filter assembly; and

FIGURE 3 is a sectional view taken along line 3—3 of FIGURE 2.

FIGURES 1–3 illustrate an oil filter 5 which has many applications, but is particularly well adapted for filtering the engine oil of an automotive engine 6 having an oil reservoir or sump 7, an oil pump unit 8 and an oil lubrication conduit system 9 provided with an oil filter inlet 10 leading into the oil filter 5 and an oil filter outlet 11 exiting from the filter 5 into the conduit system 9, it being appreciated that this type of filter 5 may be of the partial or full flow type.

The filter assembly is mounted in the lubricating system 9 in an upright position but can be mounted in any position and is provided with a housing or shell 12 consisting of a tubular member or cylinder receivable in a lower or cap portion 13 integrated with a wall or filter mounting portion 14 of the lubrication system 9. An annular sealing ring 15 about the inner periphery of the cap portion prevents oil leakage between the cap portion 13 and the shell 12 to the exterior. A shaft member 16 is welded at its upper end at 17 to the upper end of the shell 12 and extends downwardly through the shell to its lower outside end and terminating in a threaded end portion 18. A lock nut assembly 19 carried on the threaded end portion 18 draws the lower end portion 21 of the shell 12 against it to bring the shell 12 in close-sealing relation with the base 13. A cylindrical filter element 22 is disposed within the shell 12 and has multiple perforations as for example at 23 and contains filterable material for removing contamination and impurities from the oil as the oil passes therethrough from the annular passageway 24 formed between the filter element 22 and the case or shell 12 and having flow communication with the channel or passage 10 of the lubrication system 9. The central portion of the filter element defines a hollow bore portion or aperture 25 concentric with and circumscribing the shaft 16 and being in flow communication with the channel or passage 11 in the base portion 14 of the lubricating system 9, passages 10 and 11 being separated by the wall portion 27 and spring seat element 34.

The filter element 22 in addition to defining the narrow vertically elongated passage 24 also defines with the upper cap or head shell chamber portion 28 of the shell or cover 12 a triangularly-shaped chamber 29 between inner peripheral top portion 28 of the shell 12 and the top outer peripheral portion of the filter 22 and through which passes the upper part 28a of the shaft 16. A cone-shaped coil spring 30 which surrounds the upper part 28a of the shaft 16 has an upper coil or convolution 31 which is approximately the diameter of the shaft 16 and which presses upwardly in engagement with the inside surface 33 of the end wall of the shell 12.

The coils or convolutions of the spring 30 are arranged so as to increase in diameter in a downward direction along the spring axis, to a maximum as illustrated by the bottom coil 33. The spring rests on a unitized by-pass valve assembly or mechanism including a spring seat element 34 at the top. The spring seat element 34 has a horizontally disposed, flat seat portion 35 and an integral, upwardly directed annular flange 36 thereabout in which the coil 33 nests and which serves as a retainer for the spring 30.

The flat seat portion 35 of the spring seat element 34 has a ring of arcuate slots or ports 36 surrounding the shaft 16 and communicating with the chamber 29. The underside 37 of the flat seat portion 35 serves as a hold-down pressing against the inner periphery of an upwardly facing end surface 39 presented by the filter element 22 adjacent its aperture 25.

The spring seat element 34 has a lower elongated vertically extending collar portion or sleeve 40 defining with the upper flat horizontal portion 35 a bore 41 defining a cylindrical opening 42 receiving portion 43 of the shaft 16, the portion 43 being in somewhat peripheral engagement with the bore 41. A frusto-conical shaped spring unit 45 surrounds the vertical extending portion 40 of the spring retainer element 34 such as to have its lower convolution 46 of lesser diameter surround closely the lower part of the vertical spring retainer portion 42 engaging snap ring or clip 47 integrating circumferentially about the lower part of the spring seat portion 40 and the spring unit 45 continues to have its convolutions increase in diameter in diverging fashion upwardly and outwardly to a maximum extent present in a top convolution 49. The convolution 49 seats in an annular hollow element 50 provided with a bore 51 circumferentially disposed about the upper part of the spring retainer portion 40 and having an upper outwardly facing peripheral surface 53 extending across the annular groove or slot 36 of the upper retainer element portion 35 and presenting normally a flow obstruction between the chamber 29 and annular groove 36 with the annular bore or aperture or chamber 54 defined in the aperture 25 impart by the bore 25 of the filter element 22 the central bottom surface portion 55 of the horizontal retainer portion 35 of the element 34 the collar or seat 51, the lower extending portion 40 of the retainer unit 34 and the lower portion 56 of the shaft 16.

The bypass mechanism is formed in the assembly and mounting of the filter unit 5 and comprises such elements as the spring retainer and bypass element 34, the spring seat or collar 50 and the springs 30 and 45. The filter unit 5 is assembled as shown in FIGURE 2 by first placing the spring 30 about the shaft 16 of the shell 12 and then placing the spring retainer unit 34 on the shaft with subsequent placement of the spring retainer unit 50 about the spring retainer unit 34. The spring 45 is then placed about the lower portion 40 and snap ring 47 is inserted about the lower portion 40 within the groove 47a of the lower portion 40 of the retainer unit 34, and then the shell 12 with the shaft 16 is placed on the cap 13 of the base portion 14 and fastened thereto by bolt means 19. The threading of the nut means 19 compresses both springs 30 and 45 resulting in pressing of the unit 34 against the filter element 22 and the pressing of the ring seat 50 against the spring retainer element 34.

The normal flow of the lubricant or oil or fluid is from the passage 10 through the passage 24 into the filter element 22 and into chamber 54 and out through passage 11 of the lubrication system 9. However, should the filter become clogged as to prevent flow through the filter element 22 a pressure build-up will cause the oil to exert a pressure in the orifices of spring retainer unit 34 to unseat the valve element 50 and allow oil to drain into chamber 54 directly and out through passage 11 of the lubrication system 9. Consequently, there is provided a combined sealing mounting arrangement of the filter and into the lubricating system 9 and the provision of a bypass mechanism in the mounting operation internally within the filter unit 5, the spring 30 in conjunction with the retainer member 34 and bolt 16 with locking means 19 to hold the filter in a fixed position in the lubrication system 9 and the spring 45 dependent on its extent of loading seat the valve or retainer member 50 against the retainer unit 34 so as to block the opening 36. The spring 45, the valve spring seat 50, the retainer or clip 47 and the retainer unit 34 may be preassembled prior to assembling the unit 34 around the filter shaft 16 and this assembly may be secured on the shaft 56 by means of roll pin, cotter pin, O-ring, etc. for ease of element removal. The filter unit 5 may readily be disassembled by removing the locking means 19 and withdrawing the shell 12 with its shaft 16 along with spring 30 and bypass assembly unit consisting of the elements 50, 45, 47 and 34 and then the filter element 23 may be discarded and a new one put in place and the entire filter unit 5 reassembles as discussed above.

What is claimed is:

In a filter having an upwardly open cap, the combination with said cap, of:
 a housing cylinder complemental to said cap so as to define therewith a filter chamber, and having a fixed, closed upper end and an open lower end engaging the cap in a first sealed ring of pressure contact;
 a hollow cored, filter element and a hold-down stud element, disposed one element within the other in the filter chamber and with an annular space between each element and the surrounding element;
 said cylinder being substantially coextensive in length with the filter element, said cap being located adjacent the lower end of the filter element and providing support so as to hold the filter element in a completely exposed condition when the housing cylinder is removed;
 said hold-down stud element having the upper end joined fluid tight to the fixed closed end of the cylinder, and having a detachable lower end and a fastener carried thereby as the hold-down means in engagement with the cap;
 biasing means between the upper end of the housing cylinder and the corresponding upper end of the filter element; and
 a unitized valve assembly, said valve assembly comprising a spring seat clamped between said upper end of the filter element and the biasing means, and serving as a hold-down to cause the supported lower end of the element to seat in a second ring of pressure contact exerted against the cap;
 said spring seat having a depending sleeve and defining a valve port which has an axis extending generally parallel to the sleeve and which is spaced apart radially outwardly thereof;
 a filter by-passing valve carried by said sleeve below and in covering relation to said valve port, said spring seat sleeve engaging the stud element in guided sliding relation and supporting the by-passing valve thereon in guided sliding relation; said sleeve having a distal end; and
 biasing means in said unitized valve assembly between the distal end of the sleeve and the by-passing valve, and biasing said valve with predetermined sealing force against the valve port in the spring seat;
 said cap having an upstanding annular seat against which the aforesaid second ring of pressure contact is exerted by the lower end of the filter element; said cap further having an inlet passage outside said annular seat which introduces unfiltered fluid into the filter chamber, and an outlet passage inside said annular seat which is separated thereby from the inlet passage and which discharges all fluid passing through the filter element and by-passing the filter element.

References Cited in the file of this patent
UNITED STATES PATENTS

| 511,798 | Rankine | Jan. 2, 1894 |
| 2,533,266 | Kovacs et al. | Dec. 12, 1950 |
| 2,617,535 | Hamilton | Nov. 11, 1952 |

FOREIGN PATENTS

| 577,510 | Great Britain | May 21, 1946 |
| 1,111,643 | France | Nov. 2, 1955 |